Oct. 14, 1958     C. R. BUSCH     2,856,038
WHEEL AND BRAKE DISC UNIT FOR RAILWAY CAR TRUCKS
Filed Sept. 6, 1955
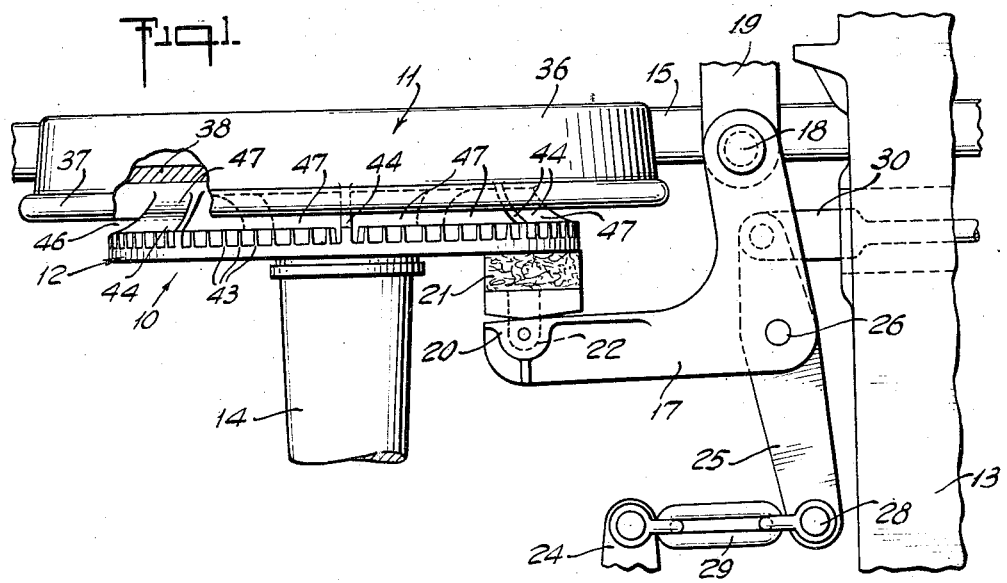
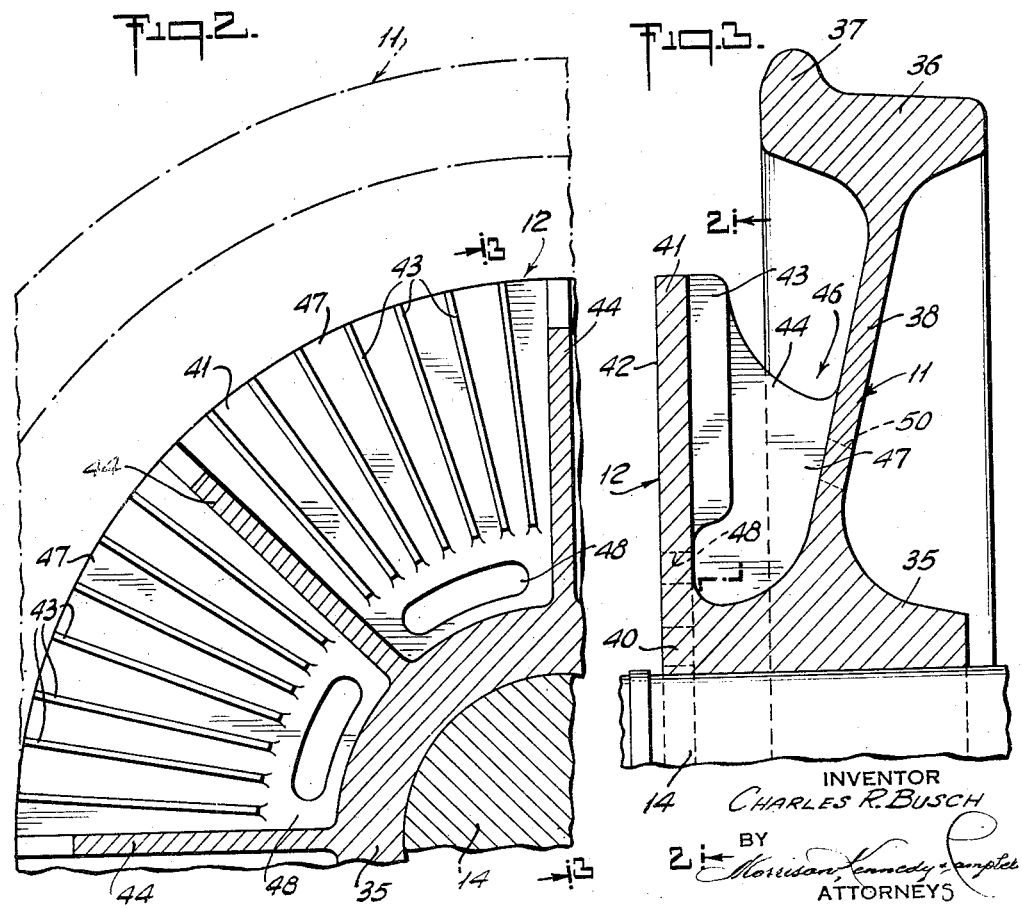
INVENTOR
CHARLES R. BUSCH
BY
ATTORNEYS United States Patent Office 2,856,038
Patented Oct. 14, 1958

2,856,038

WHEEL AND BRAKE DISC UNIT FOR RAILWAY CAR TRUCKS

Charles R. Busch, Orange, N. J., assignor to Buffalo Brake Beam Company, a corporation of New York Application September 6, 1955, Serial No. 532,448

6 Claims. (Cl. 188—218)

The present invention relates to railway car wheels and brake discs therefor.

The conventional railway freight car has two trucks, each carrying four wheels arranged into two sets of coaxial wheels. In one rotor brake disc type of brake mechanism for these wheels, as for example, in the type described in my copending application Serial No. 491,838 filed March 3, 1955, the brake shoes are applied for braking action against the faces of friction discs rotatable with respective wheels.

One object of the present invention is to provide a new and improved brake disc and wheel unit for a railway freight car, which is compact and strong enough to sustain effectively the most severe braking stresses encountered, which is constructed to provide the maximum of ventilation and heat radiation, so that overheating of the unit during normal running operations as well as during brake application is avoided and which is inexpensive and therefore affords substantial economy.

In accordance with certain features of the present invention, the brake disc coaxial with the car wheel is made integral therewith by casting or forging. Such a construction not only provides a very rigid connection between the brake disc and the car wheel unit, but is inexpensive in comparison with a unit in which the brake disc and car wheel are separately made and required to be assembled with bolts, studs or other similar fastening members. Moreover, such fastening members might become loose and fall out, thereby causing accidents as a result of the corresponding loosening of the brake disc or the lodgment of the separated fastening members into vital parts of the car truck. Also, the integral connection between the car wheel and the brake disc permits the brake disc to be placed close to the brake wheel, thereby adding to the rigidity of the unit and cutting down space, which is restricted in a car truck.

The brake disc of the present invention is provided on the outside with a circular friction face against which the brake shoe of the brake mechanism is adapted to be applied in an outboard direction when braking action is required, and the inner face of the brake disc confronting the car wheel is provided with a plurality of heat radiating fins for cooling. The hub of the brake disc and the hub of the car wheel are merged into a single hub unit, and between the inner face of the brake disc and the confronting face of the web of the car wheel are a series of radial ribs, serving not only as strengthening members for the brake disc but also as a means for integrally uniting the brake disc and the car wheel, and as diffuser vanes to promote the circulation of cooling air radially outward through the passages between the car wheel and the brake disc defined by the strengthening ribs, as well as the heat radiating fins. The brake disc has a series of holes near the hub serving as inlets by which air is admitted into these passages during normal running operations, thereby cooling the brake disc and the car wheel during these operations.

Various other objects, features and advantages of the invention are apparent from the following description and from the accompanying drawings, in which Fig. 1 is a top plan view of a part of a car truck, showing a car wheel and brake disc unit therein embodying the present invention, said unit being shown in connection with a braking mechanism;

Fig. 2 shows a fragment of the car wheel and brake disc unit taken along the lines 2—2 of Fig. 3; and Fig. 3 shows a fragment of the car wheel and brake disc unit taken along the lines 3—3 of Fig. 2.

Referring to the drawings, the car wheel and brake disc unit 10 of the present invention, comprising a car wheel 11 and a brake disc 12, is shown applied to a railway freight car truck comprising a pair of side frames (not shown), a truck bolster 13 on which the car body (not shown) is mounted, extending between said side frames and spring-supported thereon, and a pair of parallel axles 14 (only one being shown), extending between the side frames and journalled in said side frames, each of said axles carrying a pair of the car wheels 11 on its opposite ends for riding engagement with rails 15 (only one being shown). The car truck described, except for the wheel and brake units 10, is of conventional, well-known construction and is more fully described in the aforesaid copending application.

The braking mechanism, per se, for applying braking shoes to the discs 12 on the wheel and brake disc units 10 is the subject-matter of the aforesaid copending application. This braking mechanism for each car truck comprises four L-shaped brake head levers 17 (only one being shown), arranged two one one side of the bolster 13 for the two coaxial wheel and brake disc units 10 on this side of the bolster, and two on the other side of the bolster for the other two coaxial wheel and brake disc units. Each of these brake head levers 17 is pivotally secured at one end 18 to a bracket 19 rigidly affixed to a corresponding side frame and projecting laterally therefrom. The other end of the brake head lever 17 has a brake head 20 carrying a segmental brake shoe 21. Each brake head lever 17 is thereby supported to move substantially in a horizontal plane about its pivot support at 18 into braking position to apply the brake shoe 21 in an outboard direction to the friction face on the brake disc 12 and out of braking position, and the brake shoe has a yieldable connection 22 with the brake head, allowing said brake head to rock and thereby to align the brake shoe automatically into continuous face braking contact with the braking face of the disc, upon the application of the brake.

Power is applied to the four brake head levers 17 simultaneously through a bridle beam 24 extending on one side of the bolster 13 horizontally across the center line of the car truck with its middle region substantially on said center line. The intermediate section of the beam is supported from the car body by a lever (not shown) power-actuated by a pull rod (not shown) from a source of power, as for example, an air cylinder (not shown). Power is transmitted from the bridle beam 24 simultaneously to the two brake head levers 17 on one side of the bolster 13 by means of brake arms 25 (only one being shown), each pivotally supported at 26 to the elbow of the corresponding brake head lever and having a pivotal connection at one end 28 with the corresponding end of the bridle beam 24 through a flexible connection 29. For transmitting power from the brake arms 25 on one side of the bolster 13 to the brake head levers 17 on the opposite side, there are provided two brake arms (not shown) pivoted intermediate their ends to the elbow of respective brake head levers on said opposite side of the bolster and fulcrumed at one end to brackets (not shown) affixed to the side of the bolster. The latter brake arms so fulcrumed are operated from the brake arms 25 by push rods 30 (only one being shown), each passing through the bolster 13 and pivotally connected at its ends to a pair of brake arms on opposite sides of the bolster.

For a more complete disclosure of the braking mechanism described, reference is made to the aforesaid copending application.

The wheel and brake unit 10 of the present invention comprises the car wheel 11 and the brake disc 12 coaxial therewith and disposed on the inner or inboard side of the wheel, as already described. The car wheel 11 comprises a hub 35 embracing the axle 14 and keyed or otherwise affixed thereto for rotation therewith in any suitable manner, a rim 36 with a flange 37 to maintain the wheel on the rail against outward axial displacement, and a web 38 integrally interconnecting the hub and the rim.

The brake disc 12 comprises a hub 40 embracing the axle 14 and merging into the wheel hub 35 to form a continuous integral hub unit therewith, a circular disc plate 41 integrally connected to the hub 40 and presenting on its inboard or outer face an annular flat continuous friction surface 42 against which the brake shoe 21 on the brake head lever 17 is adapted to be pressed for braking action on the car wheel 11 upon angular movement of said lever about its pivot support at 18, and a series of radially extending heat radiating fins 43 on the outboard or inner face of the disc plate 41 integrally connected to said inner face.

To strengthen the connection between the brake disc 12 and the car wheel 11, there are provided equally spaced radial ribs 44 extending radially outwardly from the hubs 35 and 40 and laterally of the disc and wheel between the outboard face of the brake disc and the confronting inboard face of the wheel web 38 and integrally connected to said hubs and to said faces. These ribs 44 serve not only as a means for strengthening the integral interconnection of the car wheel 11 and the brake disc 12 but also serve to strengthen the brake disc against the strong pressures applied by braking action in an outboard direction and also to strengthen the wheel.

The integral connection and axial spacing between the car wheel 11 and the brake disc 12 forms an annular chamber 46 therebetween, subdivided into a series of radial passageways 47 by the ribs 44. This arrangement is in the form of a fan in which the ribs 44 act as radial diffusers or vanes to circulate the air over the confronting surfaces of the car wheel 11 and the brake disc 12 during running operations, so that the braking surface 42 will not be overheated upon application of the brake thereto. To assist in this circulation of the air, the brake disc 12 has a series of air inlet holes 48 near its hub 40. The web 38 of the car wheel 11 may also have a series of holes 50 therein which may serve as inlet or outlet holes, according to their radial position. In the positions indicated, these holes 50 serve as inlet holes.

The two parts 11 and 12 of the wheel and brake disc unit 10 may be made of one piece as described, by casting or by forging. The integral formation of this wheel and brake disc unit 10 is economical in comparison to a unit requiring the separate formation of the car wheel 11 and the brake disc 12 and the assembling of these separate members with studs or bolts. Moreover, since this integral formation of the wheel and brake disc unit 10 eliminates the use of threaded fastening members which might become loose or fall out, it affords greater safety against possible damages or accidents. Also, this integral formation of the wheel and brake disc unit 10 permits the car wheel 11 and the brake disc 12 to be placed axially closer together than is possible with a construction in which the car wheel and the brake disc are separate members fastened together by bolts or studs.

While the invention has been described with particular reference to a specific embodiment, it is to be understood that it is not to be limited thereto, but is to be construed broadly and restricted solely by the scope of the appended claims.

What is claimed is:

1. A wheel and brake disc unit for a railway car truck comprising a car wheel having a hub with a bore for embracing an axle, a flanged rim for riding engagement with a rail, and a web integrally interconnecting the hub and the rim, and a brake disc comprising a disc plate and a hub having a bore coaxial with said wheel bore and having a diameter substantially equal to that of said wheel bore for embracing the axle, said disc plate extending radially inwardly to the hub of said brake disc where it merges into and connects integrally to the latter hub, said disc plate presenting a brake surface on its outer face against which a brake shoe is adapted to be pressed to brake the wheel, the outer periphery of said disc plate being spaced from the web and from the rim of the car wheel, and a series of substantially radial ribs extending between and connected integrally with the confronting faces of the wheel web and the disc plate, said ribs being spaced at their radially inner ends from the inner periphery of the rim of the car wheel and defining a series of passageways extending from near the hubs towards the outer periphery of said disc plate, said passageways being open at their outer peripheries.

2. A wheel and brake disc unit as defined in claim 1, wherein the two hubs merge integrally into a single combined hub.

3. A wheel and brake disc unit as defined in claim 1, wherein the disc plate has on its inner face integral therewith a series of radial heat radiating fins each located between a pair of adjoining ribs and spaced from said web.

4. A wheel and brake disc as defined in claim 1, wherein the two hubs merge integrally into a single combined hub and the ribs extend radially inwardly to the merged hubs and are integrally connected thereto.

5. A wheel and brake disc as defined in claim 1, wherein the disc plate has holes near the hub of the brake disc to promote air circulation through said passageways.

6. A wheel and brake disc unit for a railway car truck comprising a car wheel having a hub with a bore for embracing an axle, a flanged rim for riding engagement with a rail, and a web integrally interconnecting the hub and the rim, and a brake disc comprising a disc plate and a hub having a bore coaxial with said wheel bore and having a diameter substantially equal to that of said wheel bore for embracing the axle, said hubs merging into a single combined hub, said disc plate extending radially inwardly to the hub of the brake disc, where it merges into and connects integrally to the latter hub, said disc plate presenting a brake surface on its outer face against which a brake shoe is adapted to be pressed to brake the wheel, the outer periphery of said disc plate being spaced from the web and the flanged rim of the car wheel, a series of ribs extending between and connected integrally with the confronting faces of the wheel web and the disc plate, said ribs extending radially inwardly to the merged hubs and being integrally connected thereto, said ribs being spaced at their radially outer ends from the inner periphery of the rim of the car wheel and defining a series of passageways extending from near the merged hubs towards the outer periphery of said disc plate and being open at the outer peripheries of the passageways, said disc plate having holes near the hub of the brake disc to promote air circulation through said passageways, and having on its inner face integral therewith a series of radial heat radiating fins each located between a pair of adjoining ribs and spaced from said web.

References Cited in the file of this patent

UNITED STATES PATENTS

| | | |
|---|---|---|
| 340,580 | Huber | Apr. 27, 1886 |
| 546,609 | Dearing | Sept. 17, 1895 |
| 863,420 | McKenna | Aug. 13, 1907 |
| 2,198,027 | Farmer | Apr. 23, 1940 |
| 2,274,859 | Eksergian | Mar. 3, 1942 |
| 2,352,223 | Trainer | June 27, 1944 |
| 2,382,550 | Eksergian | Aug. 14, 1945 |